(12) United States Patent
Nillies

(10) Patent No.: US 11,072,012 B2
(45) Date of Patent: Jul. 27, 2021

(54) METHOD AND DEVICE FOR INCREMENTAL FORMING OF A METAL WORKPIECE

(71) Applicant: Leifeld Metal Spinning AG, Ahlen (DE)

(72) Inventor: Benedikt Nillies, Ahlen (DE)

(73) Assignee: Leifeld Metal Spinning AG, Ahlen (DE)

( * ) Notice: Subject to any disclaimer, the term of this patent is extended or adjusted under 35 U.S.C. 154(b) by 127 days.

(21) Appl. No.: 16/308,533

(22) PCT Filed: Feb. 21, 2018

(86) PCT No.: PCT/EP2018/054243
§ 371 (c)(1),
(2) Date: Dec. 10, 2018

(87) PCT Pub. No.: WO2018/202336
PCT Pub. Date: Nov. 8, 2018

(65) Prior Publication Data
US 2019/0151924 A1    May 23, 2019

(30) Foreign Application Priority Data

May 5, 2017 (EP) ..................................... 17169758

(51) Int. Cl.
*B21D 22/16* (2006.01)
*B21D 31/00* (2006.01)

(52) U.S. Cl.
CPC ........... *B21D 22/16* (2013.01); *B21D 31/005* (2013.01); *G05B 2219/37345* (2013.01); *G05B 2219/37357* (2013.01); *G05B 2219/45152* (2013.01)

(58) Field of Classification Search
CPC ........ B21D 22/14; B21D 22/16; B21D 22/18; B21D 31/005; G05B 2219/37232; G05B 2219/37256; G05B 2219/37258; G05B 2219/37345; G05B 2219/37347; G05B 2219/37357; G05B 2219/45152; G01B 5/20
See application file for complete search history.

(56) References Cited

U.S. PATENT DOCUMENTS

| | | | | |
|---|---|---|---|---|
| 3,686,911 A * | 8/1972 | Plagemann | ............... | B21H 3/00 72/69 |
| 4,078,410 A * | 3/1978 | Lemmo | .................... | B21H 1/04 29/892.2 |
| 5,220,817 A * | 6/1993 | Wenzel | .................. | B21D 22/16 72/83 |
| 5,355,705 A * | 10/1994 | Schulze | ................. | B21D 22/16 72/81 |
| 6,067,833 A * | 5/2000 | Irie | ......................... | B21D 41/04 72/121 |
| 8,036,769 B2 * | 10/2011 | Glasser | .................. | G06Q 30/02 700/175 |
| 9,682,418 B1 * | 6/2017 | Young | ......................... | B21J 3/00 |
| 2003/0177802 A1 * | 9/2003 | Ito | .......................... | B21D 53/14 72/85 |
| 2006/0191307 A1 * | 8/2006 | Sieger | .................... | B21D 22/16 72/83 |
| 2007/0101788 A1 * | 5/2007 | Massee | .................. | B21D 22/14 72/83 |
| 2008/0022741 A1 * | 1/2008 | Arai | ....................... | B21D 22/16 72/82 |

FOREIGN PATENT DOCUMENTS

| | | |
|---|---|---|
| DE | 201 22 011 U1 | 12/2003 |
| JP | S57 182161 A | 11/1982 |
| JP | S59 061529 A | 4/1984 |

OTHER PUBLICATIONS

International Search Report issued in PCT/EP2018/054243; dated Jun. 15, 2018.
Notification of Transmittal of Translation of the International Preliminary Report on Patentability and Translation of the Written Opinion of the International Searching Authority issued in PCT/EP2018/054243; dated Nov. 5, 2019.

\* cited by examiner

*Primary Examiner* — Edward T Tolan
(74) *Attorney, Agent, or Firm* — Studebaker & Brackett PC

(57) ABSTRACT

The invention relates to a method and a device for incremental forming of a metal workpiece, having at least one spindle, on which the workpiece is clamped, and at least one spindle drive, with which the at least one spindle is set in rotation with the workpiece and/or at least one forming roller is set in rotation relative to the workpiece, wherein the at least one forming roller is advanced radially and/or axially relative to the rotating workpiece by way of at least one actuator. According to the invention, a computer-based controller is provided which records multiple machine parameters via sensors, which parameters comprise at least a rotation speed of the spindle, a position of the forming roller and forming forces and/or an advancement speed of the forming roller, and process parameters and/or workpiece parameters are also recorded by the controller, and the controller creates at least one data set in which the machine parameters are assigned to the process and/or workpiece parameters.

16 Claims, No Drawings

METHOD AND DEVICE FOR INCREMENTAL FORMING OF A METAL WORKPIECE

The invention relates to a method for incremental forming of a metal workpiece, having at least one spindle, on which the workpiece is clamped, and at least one spindle drive, with which the at least one spindle is set in rotation with the workpiece and/or at least one forming roller is set in rotation relative to the workpiece, wherein the at least one forming roller is advanced radially and/or axially relative to the rotating workpiece by way of at least one actuator.

The invention further relates to a device for incremental forming of a metal workpiece, having at least one spindle, on which the workpiece can be clamped, and at least one spindle drive, with which the at least one spindle can be set in rotation with the work-piece and/or at least one forming roller can be set in rotation relative to the workpiece, wherein the at least one forming roller can be advanced radially and/or axially relative to the rotating workpiece by way of at least one actuator.

Devices for incremental forming have been known for decades as spinning, profiling, drawing-in and spin-forming machines. These are usually equipped with a computer-aided controller, such as a CNC controller or a so-called teach-in controller.

These machines can be used to carry out non-cutting forming of a workpiece that is set in rotation. In particular during spin-forming of a complex workpiece, designing the forming method, for instance configuring the rotation speed, advancement paths, and advancement forces, may require a highly experienced machine operator or machine programmer. Owing to the complex behaviour of the metal during forming, in particular the varying strength of the workpiece material during forming and the fluctuating resilience of the material being formed, even small changes to process parameters can lead to considerable modifications to the end product. Even small material changes in the starting workpiece can require the complete process or at least for individual machine parameters to be reconfigured and adjusted. This is time-consuming and labor-intensive and requires a specialist who is experienced in non-cutting forming. Furthermore, if process adjustment is not carried out or is not completed, e.g. when the material batch is changed, this can lead to a higher reject rate.

The object of the present invention is to specify a method and a device for incremental forming of a metal workpiece, with which workpieces can be produced in an especially efficient and flexible manner.

The object is achieved by means of a method and/or device having the features of the independent claims. Preferred embodiments are indicated in the dependent claims.

The method according to the invention is characterized in that a computer-based controller is provided which records multiple machine parameters via sensors, which parameters comprise at least a rotation speed of the spindle, a position of the forming roller and forming forces and/or an advancement speed of the forming roller, in that process parameters and/or workpiece parameters are also recorded by the controller, and in that the controller creates a data set in which the machine parameters are assigned to the process and/or workpiece parameters.

A basic concept of the invention is, with a method and a machine for incremental forming, to record both machine parameters and process and/or workpiece parameters and to summarize them in a data set. A data set is created in which cause and effect are directly associated with each other.

Here, the machine parameters essentially indicate the available configuration options for a machine, in particular a spin-forming machine. In particular, the process parameters indicate parameters which are adjusted as a result of the machine parameters on the workpiece, in other words in particular form or strength changes. Furthermore, these parameters may also comprise as so-called workpiece parameters material properties which are input into the controller, in particular the type and quality of the material being formed.

The corresponding data sets can preferably be recorded in a time-dependent or path-dependent manner and summarized to form corresponding data sets or data strings, and saved.

Such data sets enable not just a particular type of quality assurance and process monitoring, but also facilitate improvements to or optimization of the method, for example in order to achieve a specified final contour of a finished workpiece.

In a preferred embodiment of the method according to the invention, the processing time, the forming time, an energy consumption, process forces, a temperature and/or a wear are recorded as process parameters. The machine can be equipped with corresponding sensors for recording time, recording energy consumption, determining force or determining temperature for this purpose. A plurality of the values recorded in this way can also be used to determine or at least estimate information about machine wear. The sensors may be provided in particular on the forming rollers and/or the guide and/or feed drives and/or the spindle and/or the corresponding drive of bearing components.

In another method variant of the invention, dimensions and/or tolerances of the workpiece are preferably recorded before, during and/or after processing as workpiece parameters. The workpiece dimensions can be recorded optically, via tactile means or in another suitable manner using appropriate measurement or recording means. It is especially expedient for a dimension change to be recorded continuously or at discrete time points during processing of the workpiece. In principle, however, a simple recording after completion of the work is also possible, for instance in the case of workpieces with a simple design. In particular where the initial workpiece is previously recorded, the completed forming can thus be indirectly determined and assigned to the corresponding machine parameters as a result. For data sets with different machine parameters in particular, statements can thus be made on improvement of the procedure and optimization of the method.

According to a further refinement of the invention, it is especially advantageous if, based on the data set determined, a value for the formability of the material or the material flow properties of the workpiece is defined. Thus, for instance, through allocation of a specific forming force or a specific advancement path of the at least one forming roller on the workpiece in comparison with the ensuing forming result on the workpiece, a statement can be made as to which forming property the material of the workpiece being processed possesses. In this manner, a statement can be made on the forming strength and on a plastic and elastic material behaviour. For example, it is conceivable in the case of an initial workpiece made of a material not known in any further detail firstly a defined small forming step is carried out with defined machine parameters, for instance a defined forming path and/or a defined forming force, in order to then record the resultant form change on the workpiece. Through assignment and comparison of the machine parameters to the form change achieved, a material determination can be carried out by a control means using saved data in a memory, in particular, for example, whether the material is an easily formed steel or a steel quality of higher strength. On the basis of this material determination, the further machine parameters can then be adapted accordingly by the control means for the further forming, in order to achieve a desired final contour of the workpiece that is also saved on the controller.

Here, it is especially advantageous for the data set to be compared with data sets stored on a memory. The data sets can be initially saved in the memory or fed in via remote data transfer from a center. It is also possible for data sets to be generated via the forming device itself and saved in the data memory of the machine. These may also be requested, if necessary, from a center and forwarded via remote data transfer. Preferably, the device is equipped with Internet access, so that this can be used for data transfer and in particular for long-term data exchange.

In an advantageous refinement of the method according to the invention, the controller changes one or more parameters of the forming to be carried out on the basis of a stored and selected data set. In particular, a program or a logic may be saved on the controller and may modify and adjust one or more machine parameters of the forming to be carried out or of a subsequent forming process on a further workpiece. Here, a machine operator or a control center can specify that an adjustment of the data sets is to be carried out according to aspects that can be preselected.

According to a further refinement of the invention, it is especially preferable here for optimization from an economic standpoint in regard to workpiece tolerances, material properties, processing time, energy consumption and/or wear is pursued by way of the controller. For instance, a machine operator or a control center can specify that a processing time is to be as short as possible. This can increase the output of the machine, for example during order peaks. Alternatively or in addition, processing may be carried out with the aim of keeping the energy consumption or machine wear as low as possible. In these cases, a somewhat increase processing time per workpiece may result. A corresponding result may also occur when a machine control is carried out with the aim of high form accuracy, in other words in the case of lowest possible workpiece tolerances. A combination of the various aspects may also take place, for instance in order to achieve a great as possible processing efficiency from the perspective of machine utilization, energy consumption and machine wear.

According to a further embodiment of the invention, it is particularly advantageous for the parameters to be recorded in a path- and/or time-dependent manner. During processing, a plurality of data sets can thus be recorded, which enables time-dependent or path-dependent documentation and allocation of the procedure.

According to the invention, an advantageous method variant is still achieved in that minimum and/or maximum limit values are defined for the parameters by the operator, via a data set and/or by the controller, wherein the incremental forming is controlled by the controller such that the specified limit values are not exceeded. These specified limit values can, for example, prevent overloading of the machine and/or of machine components.

In a further preferred method variant of the invention, the parameters are modified by the controller to achieve process optimization within the specified limit values. The controller can be designed such that individual machine parameters are always modified in particular within the specified limit values during processing of individual workpieces. Through allocation to and linking with the workpiece parameters, the controller can establish whether an improvement or a deterioration has occurred in relation to a desired method outcome. Taking this outcome into account, the controller can implement a further change or, if necessary, a reversal of the change to the at least one machine parameter. A learning process of the controller is thus achieved, so that a general improvement and process optimization can be achieved over time and as the number of workpieces processed increases.

Here, it is especially advantageous for newly determined data sets of the process optimization to be saved in a memory of the controller. If, therefore, a data set is considered to be especially advantageous for workpiece processing of e.g. a special material or a specific component based on one or more aspects, this data set can be saved for future processing operations. At the same time, this data set can be made available to a data center of the company and/or of the machine manufacturer for querying and general process data evaluation.

According to a further refinement of the method according to the invention, it is preferable that the controller determines modified process sequences and suggests them to a user or automatically implements them. A process optimization can thus be carried out fully automatically or still controlled by the machine operator.

Especially efficient operation of a machine is achieved according to a further refinement of the invention in that wear states can be determined and/or predicted by the controller, and that the controller suggests and/or prescribes maintenance dates. As a result, maintenance dates can be established according to needs, which is cost-efficient and extends the service life of a machine and the machine components. Wear states and maintenance dates can be sent not just directly to the machine but also via remote data transfer to an operating center and/or to the machine manufacturer or a service center of the machine manufacturer. All the necessary actions can thus be initiated, for example also the procurement of replacement parts. Prompt maintenance can prevent unexpected operating failures of the machine.

In a further preferred method variant, the machine parameters are monitored in a first controller, and at least one further controller monitors further machine and/or process parameters, evaluates them and sends actuating variables to the first controller for changing the machine parameters or optimizing the process. A machine according to the invention can preferably be equipped with two or more controllers or control units that carry out different functions. The first controller is, for instance, provided crucially for the actual machine control, while the second control unit takes on the task of process optimization.

The invention also relates to a device for incremental forming of a metal workpiece, which is characterized in that a computer-based controller is provided which records multiple machine parameters via sensors, which parameters comprise at least a rotation speed of the spindle, a position of the forming roller and forming forces and/or an advancement speed of the forming roller, that process parameters and/or workpiece parameters can also be recorded by the controller, and that the controller is designed to create a data set in which the machine parameters are assigned to the process and/or workpiece parameters.

The device according to the invention is especially suited to and provided for execution of the above-described method. The above-described advantages can thus be achieved.

The device according to the invention for incremental forming, for example via spinning, profiling, thickening, heading, pushing on and retracting hubs, or spin-forming of workpieces with rotational symmetry has software and hardware that preferably record operating states, process states and machine states and analyze what is necessary for safe operation, a safe process, or production reliability of the machine and the quality of the workpiece. The controller equipped with the software can preferably have a certain intelligence that enables automatic and independent optimization during the ongoing process. Optimization potential exists for example in the areas of accuracy and quality of the workpiece, use of resources, use of materials, energy consumption, machine and process costs, production utilization, tool wear or tool service life and servicing and maintenance costs. The intelligence of the machine can preferably be sufficient to generate fully automatic spinning programs that take the material flow properties into account in an optimal manner in relation to the number and form of the spinning stages. Here, for example, the flow behaviour is recorded in real time during the forming process and the forming stage is automatically simulated and adjusted. A forming procedure, in particular a spinning or spin-forming process, can thus in future depend less on the skill of the machine operator but instead mainly on the quality of the control software and its hardware. Preferably, the sensor system provided enables the quality of the forming procedure to check in real time. For example, during the ongoing process, the touching of the material beneath the roller engagement or the spinning zone can be checked via Hall sensors during the spinning procedure.

The software can also collect data and information by means of the sensor system that data and information open up completely new opportunities. For example, information on the wear state of the machine can be used to offer targeted servicing operations to the machine user.

A further preferred variant of the software and sensor system enables monitoring of the quality of the workpiece being formed and the final workpiece. For instance, the forming forces can be recorded in a path-dependent and/or time-dependent manner, where these are preferably located within a previously defined minimum and maximum limit value. The limit values can be defined for specific points or entire areas, so that envelopes or windows describe the limit values. These envelopes can be defined empirically, but preferably automatically via an intelligent software routine. Thus, for example, the ideal curve for each process can be recorded and envelopes defined at specified intervals. Ideally, these can also be created differently in sub-areas with a higher accuracy/lower tolerance. Preferably, the envelopes can be edited via simple graphical means to enable rapid, targeted adjustment in sub-areas.

Dependencies of limit values can be defined in advance and/or determined by the software. One-dimensional to multi-dimensional graphical illustration of the individual and/or overall results on a screen and/or other output devices is also possible. If the limit values are exceeded, an automatic signal can be emitted and/or measures can be initiated automatically by the controller. This can preferably go so far as to result in the device actively intervening in the process, parameters being changed or the process being stopped completely. This can be followed by an automatic notification being sent to persons, computers or other machines in the production line.

The limit values then permit a statement concerning the quality of the component or the method. Beyond the evaluation of the forming forces, the wear of the forming rollers can be monitored via measuring sensors, the wear of the spinning tool via the stripping or pushing forces, the product lubrication via flow controls of the coolant feed, and the service life of the main spindle bearings and roller shaft bearings via Hall/vibration sensors. Wear or machine displacement due to heat can be automatically compensated for via sensor system and CNC control. The monitoring of all sensors and the predefined parameters thus ensure that a good part is produced. The use of the sensor system can extend so far as to eliminate the need for additional quality assurance at the machine. This can result in considerable cost savings and reduce unnecessary machine downtimes and prevent scrap material, and generally facilitate determination of fault causes in the event of quality deviations.

The measured data can be used to evaluate the process, saved and archived so that traceability is ensured, as for example is desired in the automotive, aviation and/or space industry.

Furthermore, the software can provide data to third parties for further analysis, so that future machines and processes can be better optimized and/or the design and development of future machines and devices can be improved. For example, the recording of forces and outputs of a certain number of machines can enable determination of an average load, a maximum load and/or a load spectrum, so that when further developing the machines a calculation basis is available for determining the service life, for instance of bearings, guides and drives. In addition, the devices or machines and their design can be tailored more closely to customer needs, thus saving production costs.

Furthermore, the data or data sets recorded in this manner facilitate comparison of the theoretical simulation with the practical situation. Systematic recording also enables a knowledge database to be built up that can be provided to machine users and customers as an additional service.

In a further embodiment of the method according to the invention, the automatic process optimization by the machine controller makes a subsequent manual quality assurance redundant. The automatic process optimization by the controller can thus replace a usually provided quality inspection by operating personnel. Deviations in the process can be detected at an early stage, and compensated for or eliminated via corresponding modification and adaptation of the machine parameters.

Especially comprehensive provision of a data set is achieved according to a further refinement of the method according to the invention in that the workpiece, the at least one forming roller, a tool and/or other device components are provided with coding and/or a data memory, the information of which can be read and assigned to the determined data set. The data can be read via corresponding sensors or readers directly on the machine, or via separate means or by a machine operator.

So that the determined data sets enable direct association with the formed component, the workpiece itself can be equipped with coding and/or a data memory. Bar codes, QR codes or RFID chips are especially suitable for this. RFID chips enable a variety of data to be recorded on the production and/or the production process and the quality achieved. Such codes, memories or chips can preferably already be inserted in/attached to the raw material.

Forming rollers and/or tools and/or machine components can also be equipped with such memories that preferably contain information on original condition and wear state. The information can preferably be viewed or read and/or overwritten via the machine controller, so that faults in the process, e.g. the setup of an incorrect forming roller, can be ruled out.

The invention claimed is:

1. Method for incremental forming of a metal workpiece, having
    at least one spindle, on which the workpiece is clamped, and
    at least one spindle drive, with which either the at least one spindle is set in rotation with the workpiece or at least one forming roller is set in rotation relative to the workpiece,
    wherein the at least one forming roller is advanced either radially or axially relative to the rotating workpiece by way of at least one actuator,
wherein
    a computer-based controller is provided which records multiple machine parameters via sensors, each machine parameter including at least one of a rotation speed of the spindle, a position of the forming roller, forming forces of the forming roller, or an advancement speed of the forming roller,
    workpiece parameters are also recorded by the controller during processing,
    the controller creates at least one data set in which the machine parameters are assigned to the workpiece parameters, and
    dimensions or tolerances of the workpiece are recorded during processing as workpiece parameters.

2. Method according to claim 1, wherein
    at least one of the processing time, the forming time, an energy consumption, a process force, a temperature, or a wear are recorded as process parameters.

3. Method according to claim 1, wherein
    based on the data set determined, a value for the formability of the material or the material flow properties of the workpiece is defined.

4. Method according to claim 1, wherein
    the data set is compared with data sets stored on a memory.

5. Method according to claim 4, wherein
    the controller changes one or more parameters in the forming to be carried out on the basis of a stored and selected data set.

6. Method according to claim 1, wherein
    an optimization from an economic standpoint of at least one of workpiece tolerances, processing time, energy consumption, or wear is pursued by way of the controller.

7. Method according to claim 1, wherein
    at least one of the machine parameters or the workpiece parameters are recorded in at least one of a path-dependent manner or a time-dependent manner.

8. Method according to claim 1, wherein
    at least one of minimum or maximum limit values are specified for at least one of the machine parameters or the workpiece parameters by at least one of the operator, via a data set, or by the controller, wherein the incremental forming is controlled by the controller such that the specified limit values are not exceeded.

9. Method according to claim 8, wherein
    at least one of the machine parameters or the workpiece parameters are modified by the controller for a process optimization within the specified limit values.

10. Method according to claim 9, wherein
    newly determined data sets of the process optimization are saved in a memory of the controller.

11. Method according to claims 1, wherein
    the controller determines modified process sequences and suggests them to a user or automatically implements them.

12. Method according to claim 1, wherein
    wear states can be at least one of determined or predicted by the controller, and
    the controller at least one of suggests or prescribes maintenance dates.

13. Method according to claim 1, wherein
    the machine parameters are monitored in a first controller, and
    at least one further controller monitors at least one of further machine or process parameters, evaluates them and sends actuating variables to the first controller for changing the machine parameters or optimizing the process.

14. Method according to claim 1, wherein
    an automatic process optimization by the machine controller makes subsequent manual quality assurance redundant.

15. Method according to claim 1, wherein
    at least one of the workpiece, the at least one forming roller, a tool, or another device component is provided with at least one of a coding or a data memory, which can be read and assigned to a determined data set.

16. Device for incremental forming of a metal workpiece having
    at least one spindle, on which the workpiece can be clamped, and
    at least one spindle drive, with which either the at least one spindle can be set in rotation with the workpiece or at least one forming roller can be set in rotation relative to the workpiece,
    wherein the at least one forming roller can be advanced either radially or axially relative to the rotating workpiece by way of at least one actuator,
wherein the device is configured to form the workpiece according to a method in which
    a computer-based controller records multiple machine parameters via sensors, each machine parameter including at least one of a rotation speed of the spindle, a position of the forming roller, forming forces of the forming roller, or an advancement speed of the forming roller,
    workpiece parameters are recorded by the controller during processing,
    the controller creates at least one data set in which the machine parameters are assigned to the workpiece parameters, and
    dimensions or tolerances of the workpiece are recorded during processing as workpiece parameters.

* * * * *